United States Patent Office 2,798,577
Patented July 9, 1957

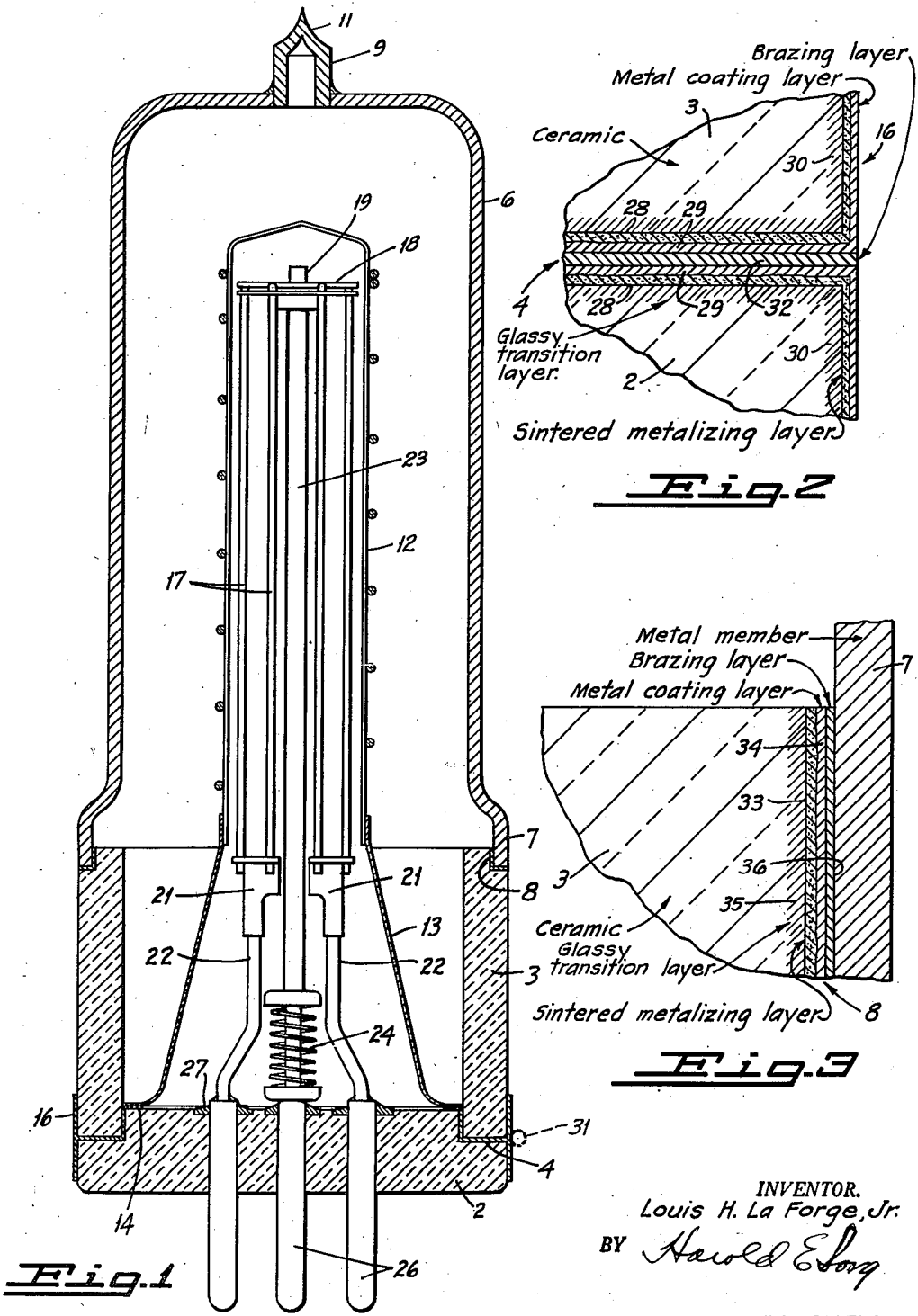

2,798,577

METALIZED CERAMIC STRUCTURE FOR VACUUM TUBE ENVELOPES AND METHOD OF MAKING THE SAME

Louis H. La Forge, Jr., Palo Alto, Calif., assignor to Eitel-McCullough, Inc., San Bruno, Calif., a corporation of California Application August 1, 1952, Serial No. 302,192

11 Claims. (Cl. 189—36.5)

My invention relates to vacuum tube envelope structures involving metalized ceramic materials, and more particularly to ceramic-to-ceramic and ceramic-to-metal seals for such structures.

Ceramics such as the alumina ceramic bodies, because of their mechanical strength and ability to withstand high temperatures, are much superior to conventional glass in the fabrication of vacuum tube envelopes. The main problem in utilizing ceramic bodies is to provide a reliable construction and technique for making vacuum-tight ceramic-to-ceramic and ceramic-to-metal seals.

The principal object of my invention is to provide an improved technique for metalizing the ceramic to produce a metal surface tightly bonded to the ceramic, which metalized area is suitable for brazing purposes or to provide contact terminals.

Another object is to provide an improved seal structure and method whereby a ceramic envelope section may be readily joined to another ceramic section or to a metal section of a tube envelope, producing a mechanically strong and vacuum-tight joint.

Still another object is to provide a seal structure in which ceramic sections are brazed together or to other metal parts, thereby producing strong and durable joint constructions for rugged vacuum tube envelopes.

The invention possesses other objects and features of advantage, some of which, with the foregoing, will be set forth in the following description of my invention. It is to be understood that I do not limit myself to this disclosure of species of my invention as I may adopt variant embodiments thereof within the scope of the claims.

Referring to the drawing:

Figure 1 is vertical sectional view of triode type of electron tube embodying the improvements of my invention.

Figure 2 is an enlarged fragmentary view showing the joint between ceramic sections of the envelope; and Figure 3 is a similar view showing the joint between ceramic and metal sections of the envelope.

In greater detail and referring first to Figure 1, the tube illustrated comprises a generally cylindrical evacuated envelope having a disk-shaped lower wall 2 of ceramic and a cylindrical side wall 3 also of ceramic. To facilitate assembly the wall sections 2 and 3 are preferably interfitted at the joint for self-alignment of the parts. This is done by providing a recess at the edge of the disk piece 2 for receiving the cylindrical piece 3.

The ceramic wall sections are metallically bonded together at joint 4 to form a vacuum-tight ceramic-to-ceramic seal involving a metalizing and brazing technique as hereinafter described in detail. This bonding layer also functions as a lead-in conductor for the grid. The ceramic used in making up the envelope is of the highly refractory type composed of a metallic oxide or oxides, such as zirconium or aluminum oxides. An alumina type ceramic body containing say 85% or more aluminum oxide ($Al_2O_3$) is preferred.

The upper portion of the envelope is formed by a cup-shaped copper anode 6, which anode has a flange 7 bonded to the ceramic wall section 3 at the joint 8. This ceramic-to-metal seal involves a bonding technique similar to that employed at the joint 4. A metal exhaust tubulation 9 at the upper end of the anode is pinched off at 11 after evacuation of the envelope.

Grid 12 in the tube is a cylindrical grid of the wire cage type located coaxially within anode 6. The grid is mounted on a tubular metal support 13, preferably of conical shape, with its lower flanged end adjacent to and connected with the metallic bond at joint 4. A grid terminal 16 is provided on the outer cylindrical surface of the envelope and is connected to the grid through the metallic bond, which terminal is preferably formed as a metalized area on the ceramic sections.

The tube illustrated has a filamentary type of cathode with vertical wire bars 17, say of thoriated tungsten, providing a generally cylindrical cathode structure lying within the grid. These filament wires are connected at the top to a disk 18 slidable on a center rod 19, half of the wires being connected at the lower ends to a bracket 21 and the other half to a similar bracket at the opposite end. These brackets are mounted on downwardly extending rods 22. Tensioning means for the filament wires comprise a sleeve 23 on the center rod pressed upwardly against disk 18 by a spring 24.

Center rod 19 and the side rods 22 are fastened to metal pins 26 extending through and bonded to the lower ceramic wall section 2. Suitable holes are provided in the ceramic disk for the pins and the latter are brazed at 27 to the upper inner surface of the disk. Areas of the ceramic around the upper edges of the holes are metalized for the purpose of making the brazes 27.

It is understood that the above tube structure is merely for purposes of illustration to show how the metalized ceramics may be incorporated to provide a vacuum-tight envelope. Similar ceramic sections of various sizes and shapes may be used to make up many different kinds of envelopes, regardless of the particular electrode arrangements therein.

The improvements embodying my invention are more particularly shown in Figures 2 and 3, Figure 2 being an enlarged view of the ceramic-to-ceramic seal at the joint 4 between the ceramic sections 2 and 3, and Figure 3 being an enlarged view of the ceramic-to-metal seal at the joint 8 between ceramic section 3 and the copper anode flange 7. In both cases the ceramic is given a special treatment to metalize the surface prior to brazing the parts together.

Referring first to Figure 2, the ceramic-to-ceramic seal comprises a metalizing layer 28 on each of the ceramic sections, which layers comprise metallic particles sintered to pretreated surfaces of the ceramic. A coating layer 29 is also preferably provided over each of the metalizing layers, the coating layer comprising a metal such as nickel or copper plated on the sintered particles. The purpose of this coating is to provide a solid metal surface to facilitate brazing and also to provide an improved terminal or contact surface.

An important feature of my invention resides in the procedure for metalizing the ceramic. It has been the practice in the past to apply metal powders directly to the surface of a ceramic body and then fire to sinter the metal to the ceramic. Such procedure relies largely upon a mechanical adherence or interlocking of the metal particles with the ceramic surface. This produces a fairly good mechanical bond but the joint is not sufficiently tight to give a dependable vacuum seal. Since the joint structure is used in the envelope of a vacuum tube, where leaks cannot be tolerated, this defect is serious.

My improved metalizing procedure comprises first applying to the ceramic a finely divided metal oxide preferably in the group comprising manganese oxide, cobalt oxide and iron oxide. An oxide of manganese such as $MnO_2$ or $Mn_2O_3$ is preferred. This metal oxide is mixed with a binder such as nitrocellulose lacquer and is applied in any suitable manner as by brushing to those surfaces of the ceramic which are to be metalized. A coating of about ½ mil thick is adequate. The ceramic thus treated is then fired in an oxidizing atmosphere to a temperature sufficient to melt or fuse the oxide and produce a vitreous or glassy transition layer 30 in the surface regions of the ceramic. Firing an alumina type ceramic body coated with manganese oxide in an ordinary air atmosphere to a temperature of about 1300° C. is satisfactory. This glassy layer is composed largely of the metal oxide of the applied coating and also of some of the original metal oxide of the ceramic, such oxides being reconstituted in the glassy phase of layer 30. Thus in the preferred combination the layer 30 would be composed principally of manganese oxide, particularly at the outer surface, but would become richer and richer in aluminum as the transition is made into the ceramic body.

The second step in the metalizing procedure comprises sintering metal particles to the treated surface of the ceramic to produce the metalizing layer 28. The metal particles used in this main metalizing layer preferably comprise a mixture of a metal such as molybdenum or tungsten together with another metal such as manganese, cobalt or iron, a mixture of molybdenum and manganese powders being preferred. I have used with good success a combination of four parts by weight of finely divided molybdenum to one part of manganese and ball milling in a nitrocellulose lacquer to a consistency suitable for brushing. The oxide treated portions of the ceramic to be metalized are then coated with a thin layer, say about two mils thicknenss, of the metal powder mixture. The ceramic body is then fired in a partially reducing atmosphere to a temperature sufficient to sinter the metal particles to the underlying oxide layer. Using the molybdenum-manganese metal mixture over manganese oxide, I preferably fire the treated ceramic in wet hydrogen to a temperature of about 1300° C.

The resulting structure comprising an underlying glassy layer of metal oxide and an overlying layer of metal particles sintered thereto, provides an excellent bond with the ceramic and produces a skin-like metalizing film which is tightly knitted to the ceramic surface. The exact nature of the metalized surface thus produced is not precisely known. Microscope examination of sections cut from the treated ceramic, however, shows that the sintered metal particles are integrally united with the underlying metal oxide and that the latter provides a dense glass-like transition media between the metal particles and the ceramic. The outermost portions of the glassy layer are probably rich in the applied oxide such as manganese oxide, with the gradual addition of aluminum in the glassy phase as the latter penetrates deeper in the ceramic body the center of the layer being composed of a complex molecular arrangement of manganese, aluminum and oxygen. The important thing is that tubes made in accordance with my invention are vacuum-tight and failures due to leaks at the joints are materially reduced.

The metalized ceramic surfaces produced by the above procedure may be brazed directly together or to other metal envelope parts. I prefer, however, to further treat the metalized ceramic by applying a solid metal coating over the sintered particles. This is preferably accomplished by electroplating with nickel or copper. I have found that a nickel plate adheres well to the underlying molybdenum-manganese mixture and is therefore preferred in that particular combination. The plating is done by suspending the metalized ceramic in an ordinary nickel electroplating bath. A metal plate of say ½ mil thickness is adequate.

In the case of the joint 4, where an outside terminal 16 is also provided on the outer surfaces of the ceramic sections, the metal-clad areas including layers 28 and 29 are extended over the edge portions of the ceramics as shown in Figure 2. The metal coating 29 thus forms the outside layer and furnishes a solid metal contact surface.

The metal-clad ceramics 2 and 3 are then brazed together at the joint 4. This is readily done by placing a wire of the brazing material adjacent the joint as indicated by the dotted line 31 in Figure 1. The parts are then run through the furnace again and brought up to the melting point of the brazing metal, at which point the brazing material flows into the joint between the coating layers 29 and provides a brazing layer 32 as seen in Figure 2. Copper-gold or copper-silver alloys are preferably used as the brazing material.

Referring to Figure 3 which shows the ceramic-to-metal seal at joint 8, it will be seen that the ceramic section 3 is metalized as previously described to provide a sintered layer 33 and a metal coating layer 34, the sintered metalizing layer 33 overlying a glassy transition layer 35. After final brazing, a layer 36 of the brazing alloy lies between the coating layer 34 and the copper flange member 7. The technique is thus similar to that first described except that the metal-clad ceramic is brazed directly to a metal member instead of to another ceramic piece.

I claim:

1. A metalized ceramic structure for a vacuum tube envelope comprising an alumina type of ceramic body, a glassy transition layer at the surface of the ceramic comprising a major proportion of an oxide of a metal selected from the group consisting of manganese, cobalt, iron, and mixtures thereof and containing a minor proportion of aluminum oxide, and a metalizing layer comprising a mixture of molybdenum and manganese particles sintered to said glassy layer.

2. A metalized ceramic structure for a vacuum tube envelope comprising an alumina type ceramic body, a glassy transition layer at the surface of the ceramic comprising oxygen in chemical combination with a metal selected from the group consisting of manganese, cobalt, iron, and mixtures thereof, and with aluminum in lesser amount, a metalizing layer comprising metal particles sintered to the glassy layer, and a metal plated over said particles.

3. A metalized ceramic structure for a vacuum tube envelope comprising a ceramic body, a glassy transition layer at the surface of the ceramic comprising manganese oxide, a metalizing layer comprising a mixture of molybdenum and manganese particles sintered to the glassy layer, and nickel plated over said particles.

4. A ceramtic-to-ceramic seal for a vacuum tube envelope comprising ceramic sections having opposed surfaces along the sealing joint, a glassy transition layer at each of said ceramic surfaces comprising a metal oxide selected from the group consisting of manganese, cobalt, and iron oxides, and mixtures thereof, metalizing layers comprising metal particles sintered to said glassy layers, and a brazing metal uniting the metalizing layers.

5. A ceramic-to-ceramic seal for a vacuum tube envelope comprising ceramic sections having opposed surfaces along the sealing joint, a glassy transition layer at each of said ceramic surfaces comprising a metal oxide selected from the group consisting of manganese, cobalt, and iron oxides, and mixtures thereof, metalizing layers comprising metal particles sintered to said glassy layers, a metal plated over said particles, and a brazing metal uniting the plated metalizing layers.

6. A ceramic-to-ceramic seal for a vacuum tube envelope comprising ceramic sections having opposed surfaces along the sealing joint, a glassy transition layer at each of said ceramic surfaces comprising manganese oxide, metalizing layers comprising a mixture of molybdenum and manganese particles sintered to said glassy layers, nickel plated over said particles, and a brazing metal uniting the plated metalizing layers.

7. A ceramic-to-metal seal for a vacuum tube envelope comprising ceramic and metal sections having opposed surfaces along the sealing joint, a glassy transition layer at the surface of the ceramic comprising a metal oxide selected from the group consisting of manganese, cobalt, and iron oxides, and mixtures thereof, a metalizing layer comprising a mixture of molybdenum and manganese sintered to said glassy layer, and a brazing metal uniting the metalizing layer to said metal envelope section.

8. The method of metalizing a ceramic body containing at least 85% aluminum oxide, which comprises applying to the ceramic an oxide of a metal in the group consisting of manganese, cobalt and iron, firing the ceramic in an oxidizing atmosphere to a temperature sufficient to form a glassy layer at the surface of the ceramic, applying to the treated ceramic a mixture of metal particles having a first component selected from the group consisting of molybdenum and tungsten and a second component selected from the group consisting of manganese, cobalt and iron, and then firing the ceramic to a temperature sufficient to sinter the particles to said glassy layer.

9. The method of metalizing a ceramic body, which comprises applying manganese oxide to the ceramic in an oxidizing atmosphere, firing the ceramic to a temperature sufficient to form a glassy layer at the surface of the ceramic, applying a mixture of molybdenum and manganese particles to the treated ceramic, and then firing the ceramic to a temperature sufficient to sinter the particles to the glassy layer.

10. The method of metalizing a ceramic body, which comprises applying manganese oxide to the ceramic in an oxidizing atmosphere, firing the ceramic to a temperature sufficient to form a glassy layer at the surface of the ceramic, applying a mixture of molybdenum and manganese particles to the treated ceramic, then firing the ceramic to a temperature sufficient to sinter the particles to the glassy layer, and then electroplating the sintered particles with nickel.

11. A seal structure for a vacuum tube envelope comprising a ceramic section and another section having opposed surfaces along the sealing joint, a glassy transition layer at the surface of the ceramic section comprising a metal oxide selected from the group consisting of manganese, cobalt, and iron oxides, and mixtures thereof, a metalizing layer comprising a mixture of molybdenum and manganese sintered to the glassy layer, and a brazing metal uniting the metalizing layer to said other envelope section.

References Cited in the file of this patent

UNITED STATES PATENTS

| | | |
|---|---|---|
| 251,544 | Edison | Dec. 27, 1881 |
| 1,923,406 | Wiegand | Aug. 22, 1933 |
| 2,004,567 | Brumbaugh | June 11, 1935 |
| 2,010,145 | Eitel | Aug. 6, 1935 |
| 2,100,187 | Handrek | Nov. 23, 1937 |
| 2,163,407 | Pulfrich | June 20, 1939 |
| 2,305,539 | Lowry | Dec. 15, 1942 |
| 2,335,376 | Ballintine et al. | Nov. 30, 1943 |
| 2,369,350 | Haven | Feb. 13, 1945 |
| 2,434,555 | Fischer et al. | Jan. 13, 1948 |

FOREIGN PATENTS

| | | |
|---|---|---|
| 15,363 | Great Britain | of 1900 |